Feb. 11, 1941.  W. SCHAAKE  2,231,739
CURRENT COLLECTOR
Filed March 4, 1939  2 Sheets-Sheet 1
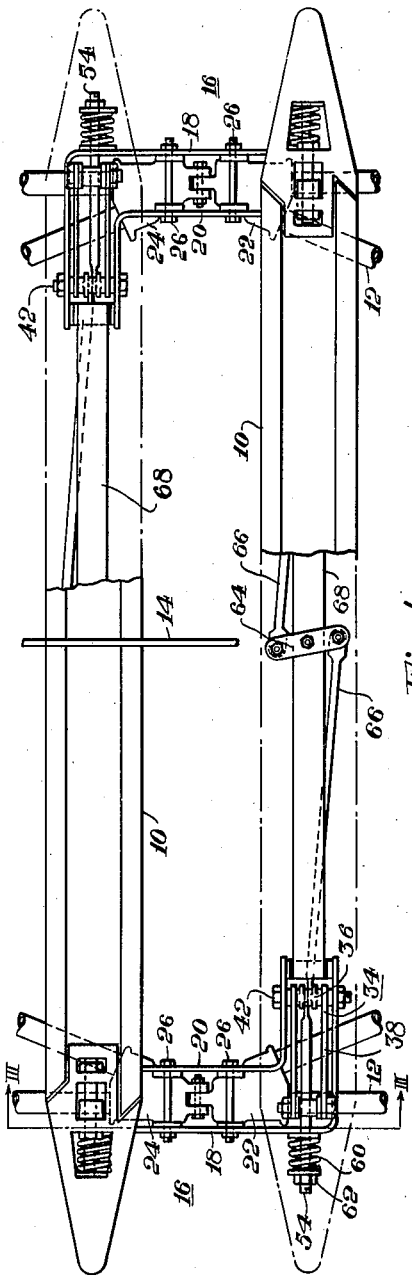
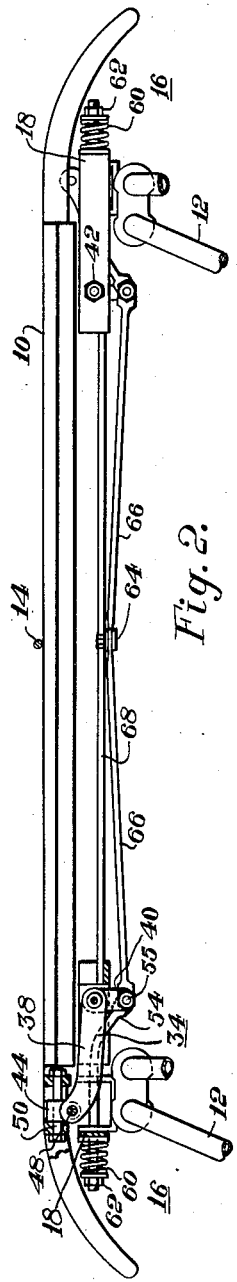
WITNESSES:  INVENTOR
  William Schaake.

Feb. 11, 1941.  W. SCHAAKE  2,231,739
CURRENT COLLECTOR
Filed March 4, 1939  2 Sheets-Sheet 2

WITNESSES:
Edward Michaels
F. V. Giolma

INVENTOR
William Schaake.
BY
Crawford
ATTORNEY

Patented Feb. 11, 1941

2,231,739

UNITED STATES PATENT OFFICE 2,231,739

CURRENT COLLECTOR

William Schaake, Pittsburgh, Pa., assignor to Westinghouse Electric & Manufacturing Company, East Pittsburgh, Pa., a corporation of Pennsylvania Application March 4, 1939, Serial No. 259,844

9 Claims. (Cl. 191—55)

My invention relates, generally, to current collectors, and it has particular reference to current collectors of the pantograph type.

In collecting current from an overhead trolley conductor for operating vehicles, such as electric locomotives or the like, it is customary to utilize current collectors of the pantograph type having one or more elongated contact or slider shoes mounted on a pantograph supporting structure on the vehicle for engaging the overhead conductor. As it is important to insure continuity of contact with the trolley conductor, so as to prevent interruption of the current flow due to irregularities in the trolley conductor, it is customary to mount the slider shoes on the pantograph supporting structure so that they are movable relative to each other.

However, as the wind velocities encountered at the relatively high speeds at which the vehicles may travel exert relatively high pressures on the slider shoes and the supporting mechanism thereof difficulty has been encountered in the constructions of the prior art in compensating for the effects of wind pressure on the slider shoe support mechanism at relatively high speeds, so as to maintain at all times the desired contact pressure between the slider shoes and the trolley conductor. Furthermore, where the slider shoes are independently mounted on the pantograph supporting structure by means of spring biased support levers adjacent the ends of the slider shoes, it has been found difficult to maintain the proper operating relation of the slider shoe when the trolley conductor engages the slider shoe adjacent one end of the shoe, and it has also heretofore been impossible to maintain a constant contact pressure between the slider shoe and the conductor. Under such conditions, the end of the slider shoe engaged by the conductor is depressed, while the other end of the slider shoe, being free, rises, and not only interferes with the proper functioning of the slider shoe, but also increases the danger of its catching in the supporting structure of the trolley conductor, and causing serious damage to both the current collector and the supporting structure. It will also be obvious that under these conditions the contact pressure exerted by the slider shoe against the trolley conductor will be substantially less than the conductor engages the slider shoe at the center and the spring biased support levers at both ends of the slider shoe act in unison.

It is, therefore, an object of my invention, generally stated, to provide a current collector of the pantograph type having improved operating characteristics.

More specifically, it is an object of my invention to provide for mounting a slider shoe on a pantograph structure for engaging an overhead conductor so that the contact pressure between the conductor and the slider shoe will be unaffected by wind pressure at high speeds and the operation of the slider shoe will not be interfered with by varying conditions of conductor pressure.

Another object of my invention is to provide a current collector having one or more slider shoes mounted on support lever members that are pivoted about axes transverse to the longitudinal axes of the slider shoes, so that movement of the support levers will be unaffected by wind pressure at relatively high speeds.

A further object of my invention is to provide for mounting a contactor slider shoe on a pantograph structure in such manner that the pressure or force exerted against the trolley conductor by the shoe will be uniform throughout the length of the shoe.

Another object of my invention is to provide for mounting a slider shoe on a current collector of the pantograph type on lever members which are pivoted so as to move in a plane transverse to the line of motion of the current collector, and operatively connect the levers to effect equalized vertical movement of both ends of the slider shoe, thus eliminating interference with the operation of the slider shoe by wind pressures at relatively high speeds and by varying conditions of conductor pressure.

A still further object of my invention is to provide for equalizing the movement of oppositely movable support levers adjacent the opposite ends of a slider shoe in a current collector of the pantograph type so as to maintain a predetermined operating relation of the slider shoe with respect to the supporting structure regardless of the position of engagement of the trolley conductor along the shoe.

Other objects will, in part, be obvious and will, in part, appear hereinafter.

In practicing a preferred embodiment of my invention, a pair of elongated slider shoes may be independently mounted on a pantograph supporting structure, for engaging an overhead trolley conductor, by means of support levers which are attached to the slider shoes adjacent each end, and which are pivotally mounted on the supporting structure so as to move in alignment with each other, but in opposed relation.

Biasing springs are provided in connection with each of the support levers for urging the support levers to their uppermost position, and equalizing means is provided for connecting the support levers at the opposite ends of each slider shoe so as to ensure equalized movement of the support levers in opposite directions under varying conditions of contact pressure, thus effecting equalized movement of both ends of each slider shoe in a vertical direction, and maintaining the slider shoes in a substantially parallel relation with the base of the supporting structure under all operating conditions.

For a more complete understanding of the nature and scope of my invention, reference may be had to the following detailed description taken in connection with the accompanying drawings, in which:

Figure 1 is a plan view, broken away in part, of a current collector embodying a preferred form of my invention;

Fig. 2 is a partly sectioned side view of the current collector of Fig. 1; and

Figure 3:
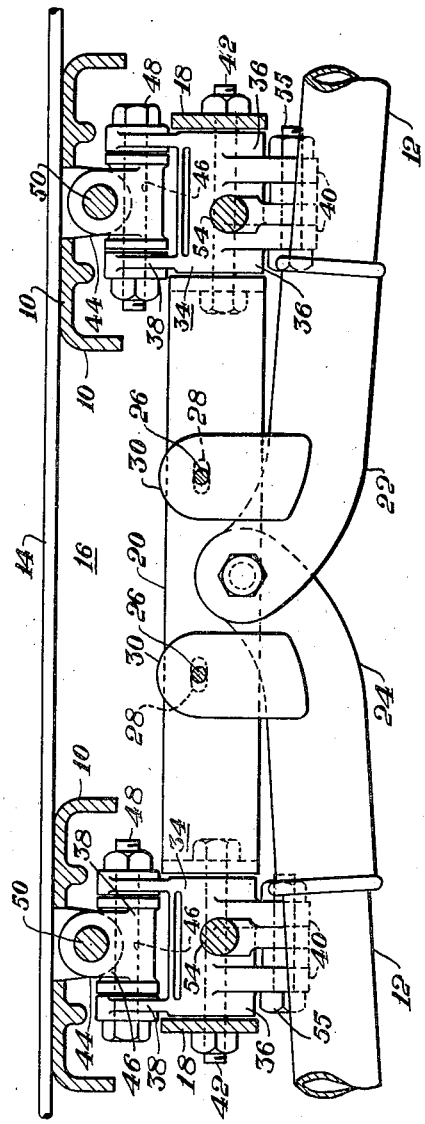
Fig. 3 is an enlarged section view of the current collector along the line III—III of Fig. 1.

Referring particularly to Figs. 1 and 2 of the drawings, the reference numerals 10 denote generally a pair of slider shoes which are mounted in parallel relation on a pantograph supporting structure 12 for engaging an overhead trolley conductor 14. As the details of construction of this form of supporting structure are well known in the art, and it forms no part of the invention, the supporting structure is shown only in part in the accompanying drawings.

A support frame 16 is provided at each end of the pantograph structure 12 for facilitating the mounting of the slider shoes thereon. For example, the support frame 16 may comprise a pair of substantially U-shaped side members 18 and 20, which may be formed by bending flatwise suitable lengths of steel bar or the like. The side members 18 and 20 are secured by suitable means to the hinged head members 22 and 24 of the pantograph supporting structure 12 in parallel relation to each other with the end portions thereof extending inwardly. The support frames 16 may be secured to the head members by means of pins 26 which pass through slots 28 in the central portion of the side members and the upstanding ear portions 30 on the head members 22 and 24 of the pantograph structure as shown in Fig. 3. Relative motion of the head members 22 and 24 as the pantograph structure is raised or lowered, is, therefore, not interfered with by the mounting of the end frames 16 in this manner as the pins may move freely in the slots 28.

In order to mount the slider shoes 10 in movable relation with respect to the pantograph supporting structure 12 and also with respect to each other, support lever members 34 are provided, comprising, preferably as shown in Figs. 2 and 3 of the drawings, a hub portion 36 having an upwardly projecting bifurcated lever arm 38 and a downwardly projecting bifurcated lever arm 40. The support levers 34 may be pivotally mounted in the support frames 16 between the inwardly projecting ends of the side members 18 and 20, by the bolts 42, so that each lever is paired in alignment with a lever at the other end of the supporting structure, but is movable in opposed relation thereto.

Since the support levers 34 at the opposite ends of the supporting structure are positioned so as to be movable in opposed relation, means such as the adapter 44 may be provided for connecting the support levers 34 to the slider shoes 10, so as to allow for movement of the ends of support lever arms 38 relative to the slider shoes as the slider shoes move vertically under varying conditions of contact pressure. For example, as may be seen from Figs. 2 and 3 of the drawings, the adapter 44 may comprise a body member having a transverse bore 46 for receiving a pin 48, whereby the adapter is pivotally positioned between the bifurcated portions of the upwardly extending arm 38 of the lever member 34. An additional opening is provided in the body member of the adapter at right angles to the transverse bore 46 for receiving a pin 50, which secures the adapter to the slider shoe 10, and on which the adapter is disposed to slide, so as to provide for relative movement of the ends of the arms 38 of the support levers and the slider shoe 10, as the slider shoe moves vertically.

In order to bias the slider shoe 10 upwardly to a predetermined position, a tension rod 54 may be connected to the downwardly projecting arm 40 of each support lever 34 by the pin 55, and disposed to pass through an opening in the side member 18 of the support frame 16 as shown in Fig. 2 of the drawings. Suitable means such as the coil spring 60, which is positioned on the tension rod 54 and secured thereon by means of a nut 62, may be provided for subjecting the support lever 34 to a biasing force, so as to urge the support lever 34 to raise the slider shoe 10 to its uppermost position. Adjustment of the pull exerted by the tension rod 54 may be readily secured by changing the position of the nut 62 on the rod.

In order to equalize the vertical movement of the opposite ends of each slider shoe 10, the independently mounted support lever members 34 at the opposite ends of the slider shoe are preferably operatively connected so as to ensure equalized movement thereof. To attain this end, equalizing means such as the pivoted equalizer lever 64 is provided, having equalizer rods 66 connected from the opposite ends thereof to the downwardly extending lever arms 40 of the support levers 34 at each end of the slider shoe. The lever 64 is preferably pivotally mounted on a support bar 68 which is connected between the inwardly extending ends of the support frame 16. Thus, if one support lever moves, the support lever at the other end of the slider shoe must move through an equal distance in the opposite direction. The slider shoe is, therefore, maintained in the proper operating position, regardless of the point of contact of the conductor with the slider shoe. Furthermore, it will be apparent that inasmuch as movement of the support levers 34 is equalized and each support lever is provided with biasing means, such as the spring 60, the pull exerted by the tension rods 54 will be cumulative. Thus, regardless of the point of engagement of the trolley conductor with the slider shoe, whether at the center of the shoe or adjacent an end thereof, the springs 60 will act together and the pressure between the slider shoe and the conductor will be uniform throughout the length of the slider shoe.

From the above description, taken in connection with the accompanying drawings, it will be apparent that in a current collector embodying the principles of my invention, interference with the operation of the current collector by variations in wind pressure is eliminated. Since the support levers are movable in planes transverse to the line of motion of the current collector, no component of wind pressure along the line of motion of the current collector can have any effect on the operation of the support levers. As the support levers at the opposite ends of the slider shoes are disposed to move in opposed relation and are connected by means of the equalizer rods and levers, they can move only in opposite directions. Hence, any component of wind pressure along an axis parallel to the longitudinal axis of the slider shoe, or transverse to the line of motion of the current collector, can have no effect on the movement of the support levers, since such component of wind pressure would tend to move the support levers in the same directions, and motion of the support levers in this manner cannot be effected. Moreover, since the support levers are connected so as to be movable only in opposed relation and in equal amounts, it is also apparent that the slider shoe will thereby be so restricted in its motion that each end of the slider shoe must move the same amount vertically, and the proper operating position of the slider shoe will thereby be maintained under all operating conditions, regardless of the location of the point of contact of the trolley conductor with the slider shoe.

Since certain changes may be made in the above description, and different embodiments of the invention may be made without departing from the spirit thereof, it is intended that all the matter contained in the above description or shown in the accompanying drawings shall be considered as illustrative and not in a limiting sense.

I claim as my invention:

1. A current collector for a vehicle comprising, a pantograph supporting structure for mounting the current collector on the vehicle, a plurality of slider shoes for engaging an overhead conductor, a pair support members pivotally mounted on the supporting structure for movement in a plane transverse to the line of motion of the vehicle for supporting each slider shoe in movable relation to the supporting structure, and means connecting the support members to maintain a predetermined relation between the ends of each slider shoe.

2. A current collector for a vehicle comprising, a supporting structure, a plurality of elongated slider shoes disposed to be independently mounted on the supporting structure, a connecting member slidably secured adjacent each end of a slider shoe, a lever member pivotally connected to each connecting member and pivotally supported by the supporting structure to pivot about an axis transverse to the longitudinal axis of the slider shoe, and an equalizing member operatively connected to each lever member for affecting equalized movement of the ends of each slider shoe.

3. The combination in a current collector, of a supporting structure, a plurality of elongated slider shoes for engaging an overhead conductor, pivotal support means adjacent each end of the slider shoes supported on the supporting structure for independently mounting the slider shoes for limited motion relative to each other, a substantially rigid equalizer member connected to each support means, and independent means connecting the equalizer members connected to the support means of each of the slider shoes to insure equalized movement of the support means of each slider shoe for maintaining a predetermined relation between the ends of each slider shoe.

4. A current collector comprising, a pantograph supporting structure, a plurality of elongated slider shoes for engaging an overhead conductor, a pivoted support lever connected to the supporting structure and to each end of the slider shoes for independently mounting the slider shoes for movement relative to the supporting structure, each of said levers being pivoted about an axis transverse to the longitudinal axis of the slider shoe, and a pivoted connecting member positioned intermediate the support levers, and means connecting the support levers to the connecting member for maintaining a predetermined relation between the slider shoe and the supporting structure.

5. The combination in a current collector for a vehicle, of a supporting structure, a pair of elongated slider shoes positioned transversely to the line of motion of the vehicle for engaging an overhead conductor, a support frame secured to the supporting structure adjacent each end, a pair of support levers pivotally supported by the support frames in opposed relation and connected to one of the slider shoes adjacent the ends thereof for supporting the slider shoe in movable relation to the supporting structure, a pivoted equalizing member positioned intermediate the support levers, and means connecting the support levers to the opposite ends of the equalizing member for equalizing the movement of the support levers.

6. A current collector comprising, a supporting structure, an elongated slider shoe for engaging an overhead trolley conductor, a support frame secured to the supporting structure adjacent each end, a pair of support levers positioned in opposed relation at the opposite ends of the slider shoe for mounting the slider shoe in movable relation to the supporting structure, adjustable biasing means for urging the levers to a predetermined position, a support member connecting the support frames, a pivotal equalizer member mounted on the support member, and means connecting the levers to the equalizer member to equalize the movement thereof and provide uniform contact pressure between the slider shoe and the trolley conductor throughout the length of the slider shoe.

7. A current collector comprising a pantograph supporting structure, a plurality of elongated slider shoes for engaging a conductor, a plurality of levers pivotally mounted on the supporting structure in opposed relation for movement in a plane parallel to the longitudinal axis of the slider shoes an adapter slidably secured to the slider shoes adjacent the ends for yieldingly connecting the support levers to the slider shoes, means for resiliently urging the support levers to a predetermined position, and means connecting the support levers of a slider shoe to maintain a predetermined relation between the slider shoe and the supporting structure.

8. A current collector for a vehicle comprising, an elongated slider shoe, a pantograph structure for supporting the slider shoe on the vehicle, a pair of support members pivotally supported by the pantograph structure for movement in a plane transverse to the line of motion of the vehicle for supporting the slider shoe in movable relation to the pantograph structure, and means connecting the support members to maintain a predetermined relation between the ends of the slider shoe.

9. The combination in a current collector for a vehicle having an elongated slider shoe and a pantograph structure for supporting the slider shoe on the vehicle, of a support member adjacent each end of the slider shoe pivotally supported by the pantograph structure for movement about an axis substantially parallel to the line of motion of the vehicle to provide limited vertical movement of the slider shoe relative to the pantograph structure, an equalizer member connected to each support member for longitudinal movement substantially transverse to the line of motion of the vehicle, and means connecting the equalizer members to insure equalized movement of the support members and maintain a predetermined relation between the ends of the slider shoe.

WILLIAM SCHAAKE.